United States Patent [19]
Boguslawski et al.

[11] 3,956,056
[45] May 11, 1976

[54] FABRIC COATING BY EXTRUSION DIE-CALENDERING APPARATUS AND METHOD

[75] Inventors: Jan Janusz Boguslawski, New York, N.Y.; Paul Geyer, Detroit, Mich.; Frederick Nishwitz Taff, Roxbury, Conn.

[73] Assignee: Uniroyal Inc., New York, N.Y.

[22] Filed: Sept. 27, 1974

[21] Appl. No.: 510,105

Related U.S. Application Data

[62] Division of Ser. No. 308,142, Nov. 20, 1972, Pat. No. 3,869,301.

[52] U.S. Cl. ............................... 156/500; 156/244; 264/176 R; 425/101; 425/113; 425/115; 425/224; 425/325
[51] Int. Cl.² ..................................... B29D 7/10
[58] Field of Search ............. 156/244, 500; 264/171, 264/176 R, 177 R, 212; 425/101, 113, 114, 115, 224, 325, 328, 447, 461, 466, 471

[56] References Cited
UNITED STATES PATENTS

| | | |
|---|---|---|
| 3,271,223 | 9/1966 | Sudo .................................. 156/500 |
| 3,462,332 | 8/1969 | Goto .................................. 156/500 |
| 3,515,778 | 6/1970 | Fields et al. ......................... 425/101 |
| 3,609,810 | 10/1971 | Coghill ............................... 425/113 |
| 3,635,631 | 1/1972 | Fields................................. 425/224 |
| 3,647,346 | 3/1972 | Minnie ........................... 264/176 R |

*Primary Examiner*—Caleb Weston
*Attorney, Agent, or Firm*—Philip Sands

[57] ABSTRACT

Method and apparatus for coating a fabric with elastomeric stock, wherein improved impregnation of the interstices of the fabric is achieved, the method comprising concomitantly feeding both elastomeric stock and a fabric in pressurized contact with one another between mutually confronting stationary and movable surfaces. The mutually confronting surfaces converge toward one another and cooperatively define a pressure chamber terminating in a restriction orifice. The movable surface is driven in a direction of feed of both the stock and fabric to frictionally carry and wedge both into and through the pressure chamber, thereby causing the interstices of the fabric to be increasingly impregnated by the stock.

13 Claims, 20 Drawing Figures

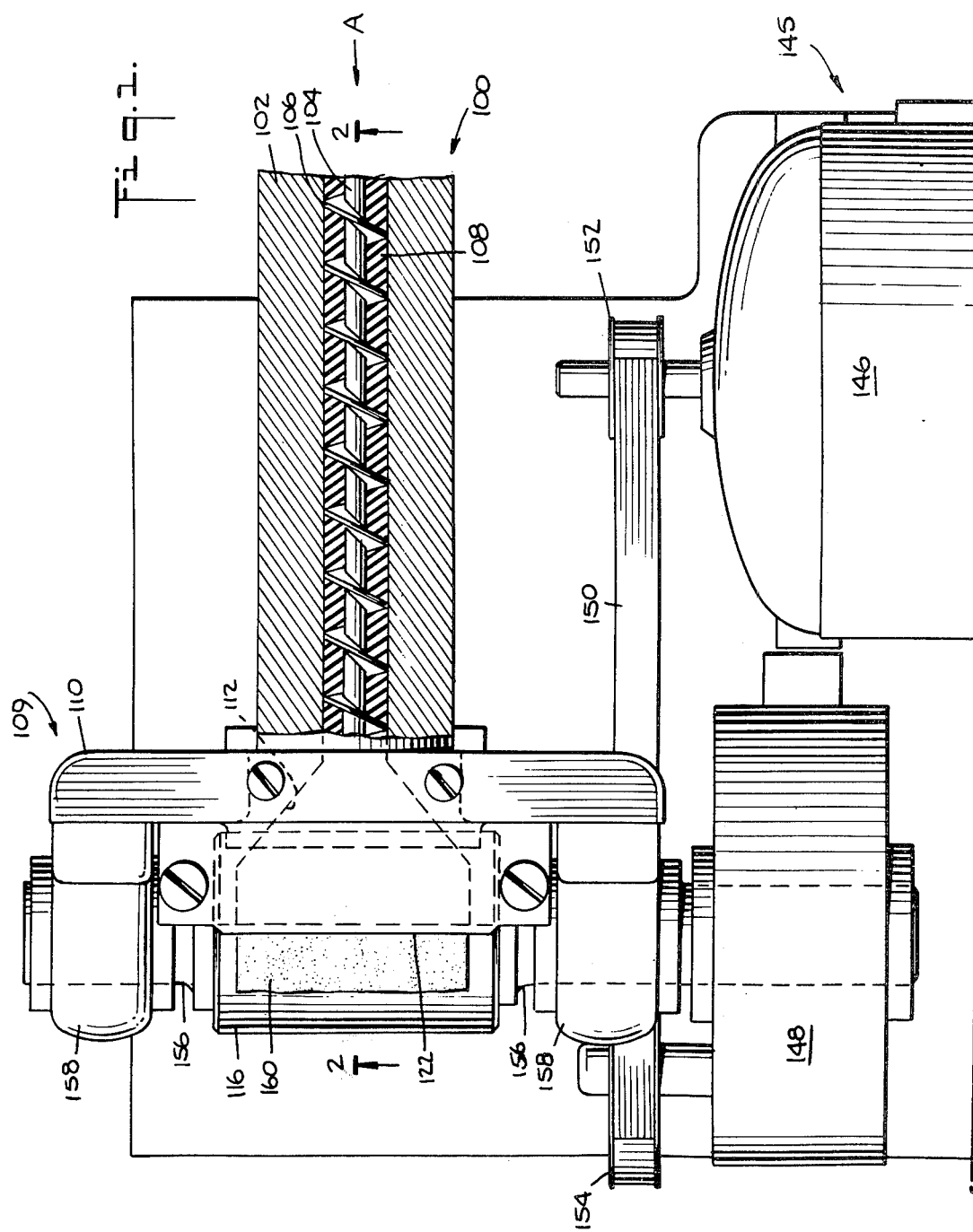

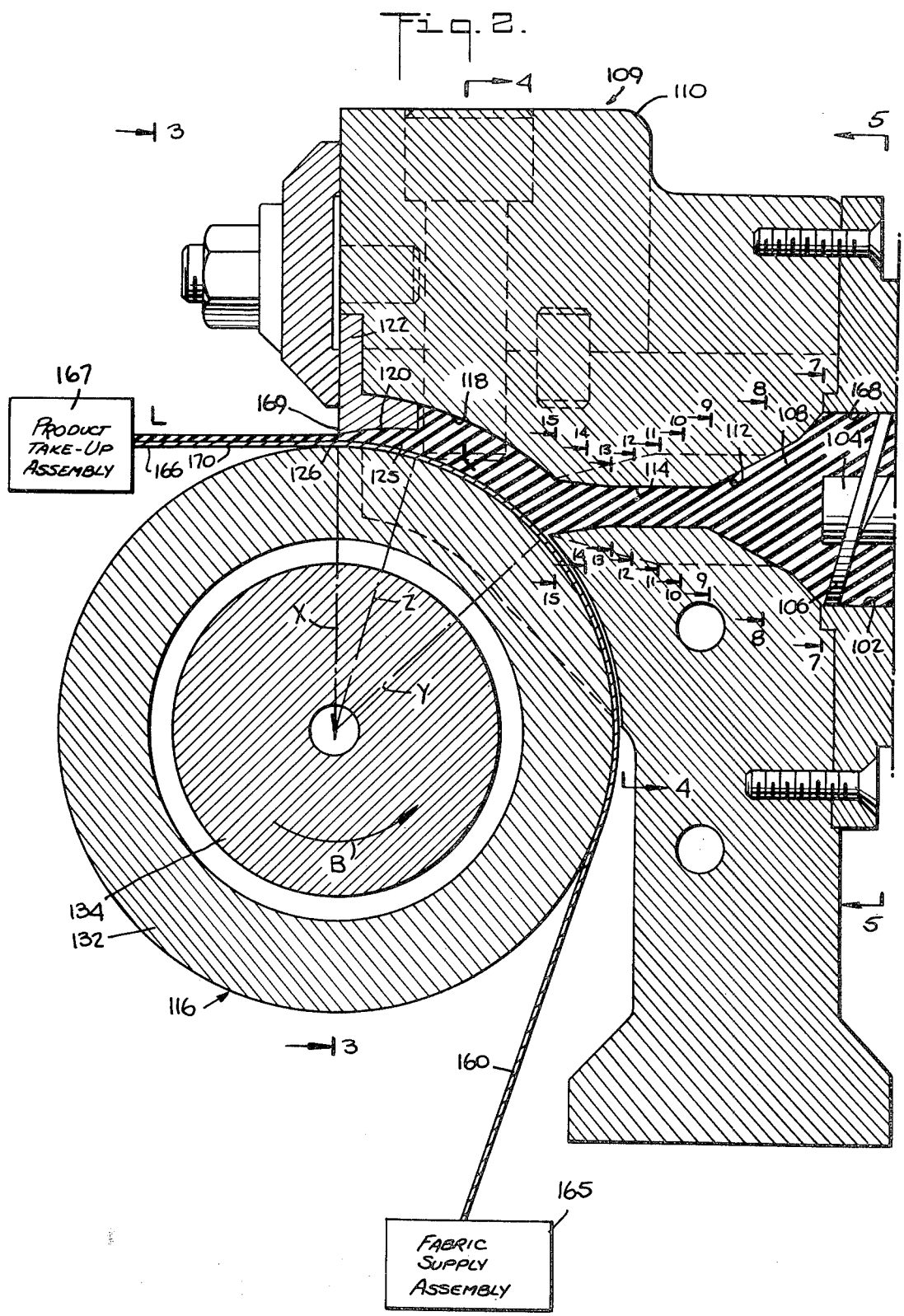

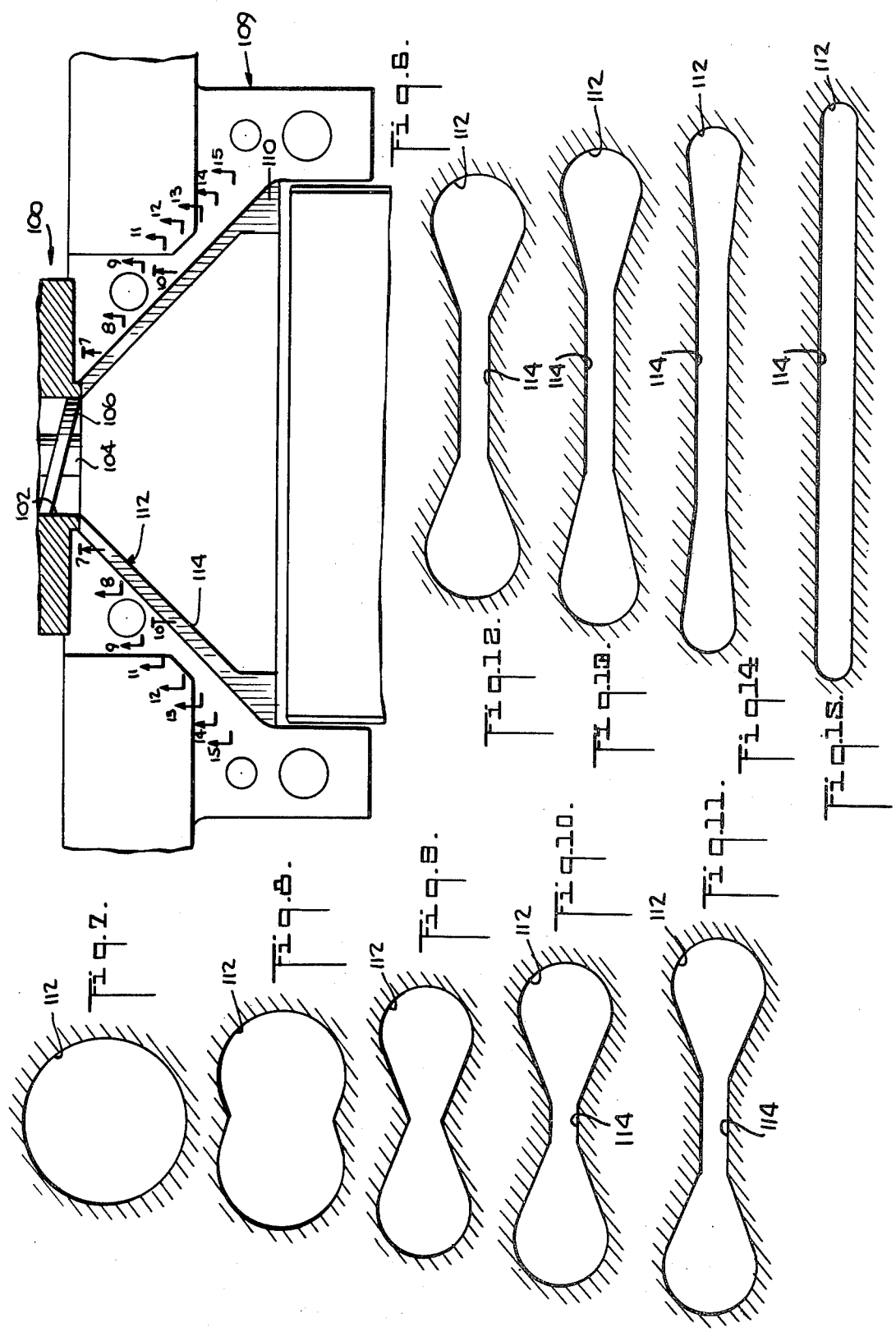

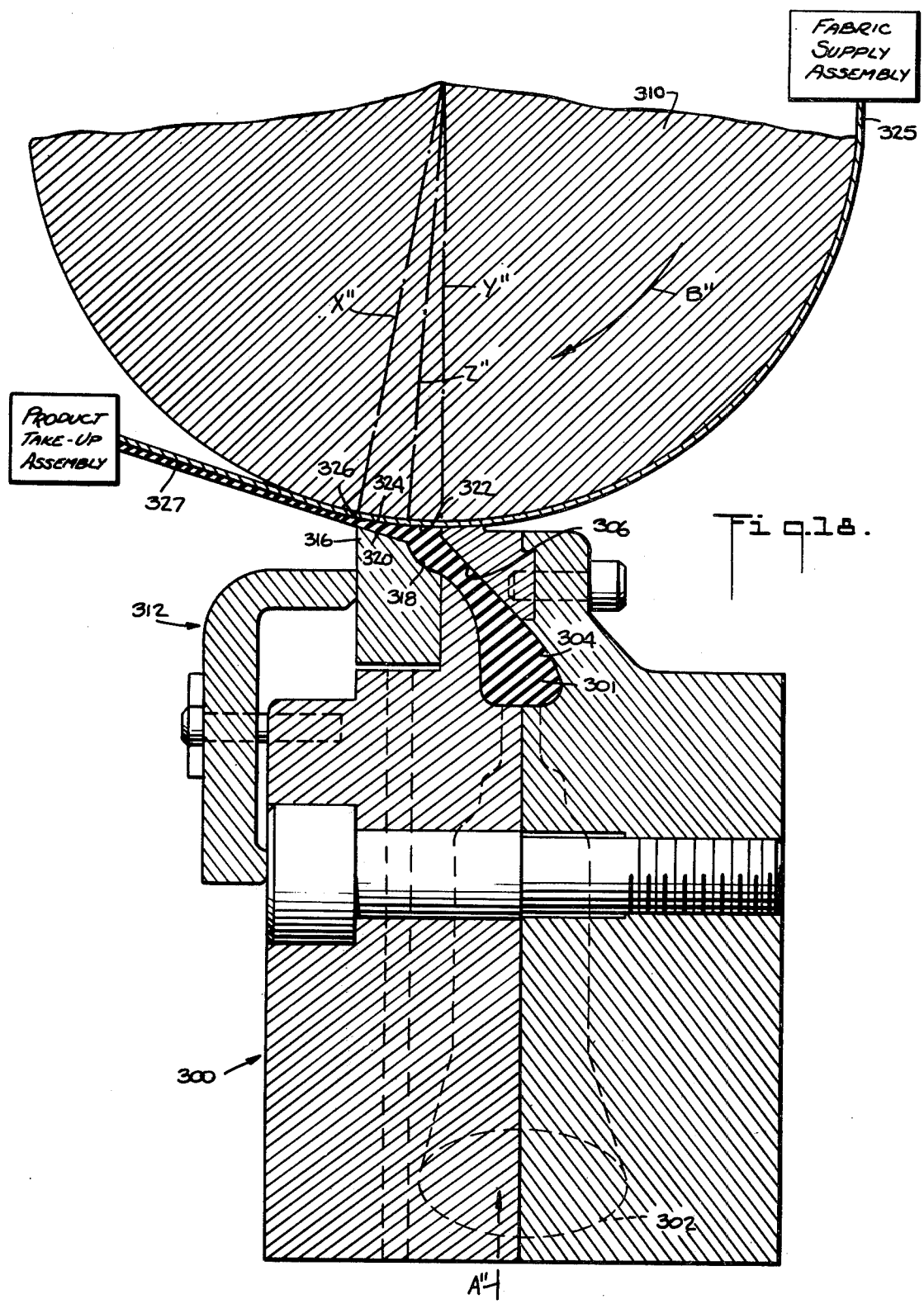

FABRIC COATING BY EXTRUSION DIE-CALENDERING APPARATUS AND METHOD

This is a division of application Ser. No. 308,142, filed Nov. 20, 1972 now U.S. Pat. No. 3,869,304.

BACKGROUND OF THE INVENTION

The present invention relates generally to a method and apparatus for coating a fabric with elastomeric stock, wherein improved impregnation of the interstices of the fabric is achieved, and more particularly to a method and apparatus in which there is utilized an assembly constituted primarily of a driven roller and a stationary dieblade confronting the roller and defining therewith a convergent nozzle-like chamber. The chamber surfaces operate on elastomeric stock to cause the latter to increasingly impregnate a fabric fed concomitantly therewith between the driven roller and stationary die-blade as both the elastomeric stock and fabric are commonly wedged and subjected to increasing pressure along their common direction of feed.

Conventional practices for manufacturing or otherwise forming elastomeric products, in the nature of conveyor belts and the like, generally employ a procedure in which the fabric substance of the product is coated or impregnated by an elastomeric stock material such as natural rubber, synthetic resins of thermoplastic nature, combinations of natural rubber and synthetic resins, or any other suitable plasticized composition generally utilized therefor, the coating or impregnation being effected by a pair of opposed rolls of a conventional calender apparatus.

In this respect, the fabric is fed between and through the opposed rolls of the calender, one or both of the opposed or primary rolls being associated with respective secondary rolls which provide means for banking excess elastomeric stock upon the primary rolls so that the primary rolls may, upon contacting the opposite surfaces of the fabric, transfer the elastomeric coating thereon onto one or both of the opposite fabric surfaces.

The degree of impregnation of the fabric by the elastomeric stock is primarily dependent upon, or is a function of, the degree of pressure that the opposed calender rolls can impart to the elastomeric stock and fabric as the latter pass through the nip therebetween. As is well understood, conventional calender rolls permit means for altering or increasing the extent of pressure imparted to the elastomeric stock and fabric such as by banking, in a manner aforementioned, or by increasing the peripheral velocity of the rolls, or by decreasing the clearance or nip between the opposed rolls so that the respective periphery of each of the rolls exerts a greater pressure against the opposite surfaces of the elastomeric stock and fabric as the latter pass therebetween.

The disadvantage associated with merely relying upon the capacity for increasing the roll velocity or narrowing the nip clearance is that the product may be insufficiently coated or unduly thin as formed. Alternatively, the fabric may be torn due to excessive stress as the elastomeric stock is transferred thereto. Thus, there is a limitation to the extent to which the roll velocity can be increased or the clearance between the calender rolls may be reduced. This is a severe restriction on the degree of pressure that can be utilized for transferring the elastomeric stock from the calender rolls to the opposite surfaces of the fabric for purposes of coating and impregnating the latter.

Moreover, the nip between conventional calender rolls provides only a minimum effective or working surface area with which the opposite elastomeric stock and fabric surfaces coact, the effective or working surface area being respective segments of the opposing rolls of minimal arcuate extent which converge toward and thereafter diverge away from one another. Thus, only an extremely short segment of each of the opposed rolls contacts the opposite surfaces of the elastomeric stock and fabric during transferring of the elastomeric stock to the fabric surfaces. This results in a minimal residence period during which the elastomeric stock and fabric are under pressure by the opposing rolls. It also results in a lesser degree of impregnation of the fabric by the elastomeric stock than may be most desirable under the circumstances, and in a lesser capacity to resist or retard swelling of the stock after the latter and fabric issue from between the rolls.

Therefore, although calender rolls permit the increasing of nip pressures such as by banking or otherwise building up of excess elastomeric stock upon each of the calender rolls, or by increasing the peripheral velocity of the rolls, or by decreasing the nip clearance between the rolls, the extent of increasing the pressure in this manner is still limited. Moreover the effective extent of each of the arcuate working surface segments of the opposing rolls is self-limiting and thus, the degree of impregnation of the fabric by the elastomeric material, and swell-retardation of the elastomeric material after coating, remains limited.

SUMMARY OF THE INVENTION

Accordingly, it is a principal object of the present invention to provide a new and improved extrusion die-calendering apparatus and method in which not only can the pressure to which both the elastomeric stock and fabric are subjected be significantly increased, but also the residence period during which both the elastomeric stock and fabric are commonly subjected to the increased pressure will be likewise significantly increased so as to permit an extremely high degree of impregnation of the fabric by the elastomeric stock.

It is another object of the present invention to provide a fabric coating assembly in which the principle of two roll calendering is utilized in part, in that one roll is retained while the second, contoured roll is replaced by a less bulky, readily changeable, stationary, contoured die-blade which can be more accurately fabricated with a sharp profile at high production rates than can be contoured roll, so as to permit, when desirable, shaping of the elastomeric stock coating with a conformingly sharp profile.

It is still another object of the present invention to obviate the formation of air pockets within the elastomeric stock as it is impregnated into the fabric and, thereby, provide a dense air-free product of uniform character and quality.

It is still a further object of the present invention to provide extrusion die-calendering apparatus in which the extrusion speed can be somewhat varied without affecting the degree of impregnation of the fabric by the elastomeric material, the degree of impregnating being primarily a function of the rate of fabric feed.

To this end, the present invention relates to a method and apparatus for coating a fabric with elastomeric stock, wherein improved impregnation of the fabric's interstices is achieved, the apparatus comprising a driven roller and a stationary guide-surface which coextensively confronts an arcuate segment of the driven roller in spaced relation. The stationary guide-surface and arcuate segment of the roller cooperatively define a pressure chamber terminating in a restriction orifice. The apparatus furthermore comprises means for introducing a fabric into the chamber and onto the arcuate segment of roller to be carried by the latter to and through the restriction orifice, and means for introducing elastomeric stock under pressure into the chamber and upon the fabric so as to at least partially impregnate interstices in the fabric upstream of the restriction orifice. The pressure chamber acts to reduce the cross sectional thickness of the elastomeric stock, as the latter is subjected to increasing pressure, and causes the fabric to be increasingly impregnated by the stock as both are wedged therethrough.

BRIEF DESCRIPTION OF THE DRAWINGS

The above and additional objects and advantages of this invention will be more clearly understood from the following detailed description thereof when read in conjunction with the accompanying drawings, in which:

FIG. 1 is a fragmentary, schematic plan view, partly in cross-section, illustrating structure pursuant to a first embodiment of the present invention;

FIG. 2 is a fragmentary, side elevation, cross-sectional view, on an enlarged scale, of the principal structure of the first embodiment, taken along the line 2—2 in FIG. 1;

FIG. 3 is a fragmentary, partly cross-sectional, end elevation view, on a reduced scale, taken along the line 3—3 in FIG. 2;

FIG. 6 is a fragmentary cross-sectional view taken along the line 6—6 in FIG. 4;

FIGS. 7-15 are enlarged schematic representations illustrating the downstream change in peripheral contour of a transition pressure chamber in the first embodiment of the present invention, the views being taken along respective lines 7—7 through 15—15 in FIGS. 2 and 6;

FIG. 17 is a view similar to that of FIG. 2 but illustrating a second embodiment of the present invention;

FIG. 18 is a view similar to that of FIG. 2 but illustrating a third embodiment of the present invention;

DETAILED DESCRIPTION OF THE INVENTION

Figure 8:
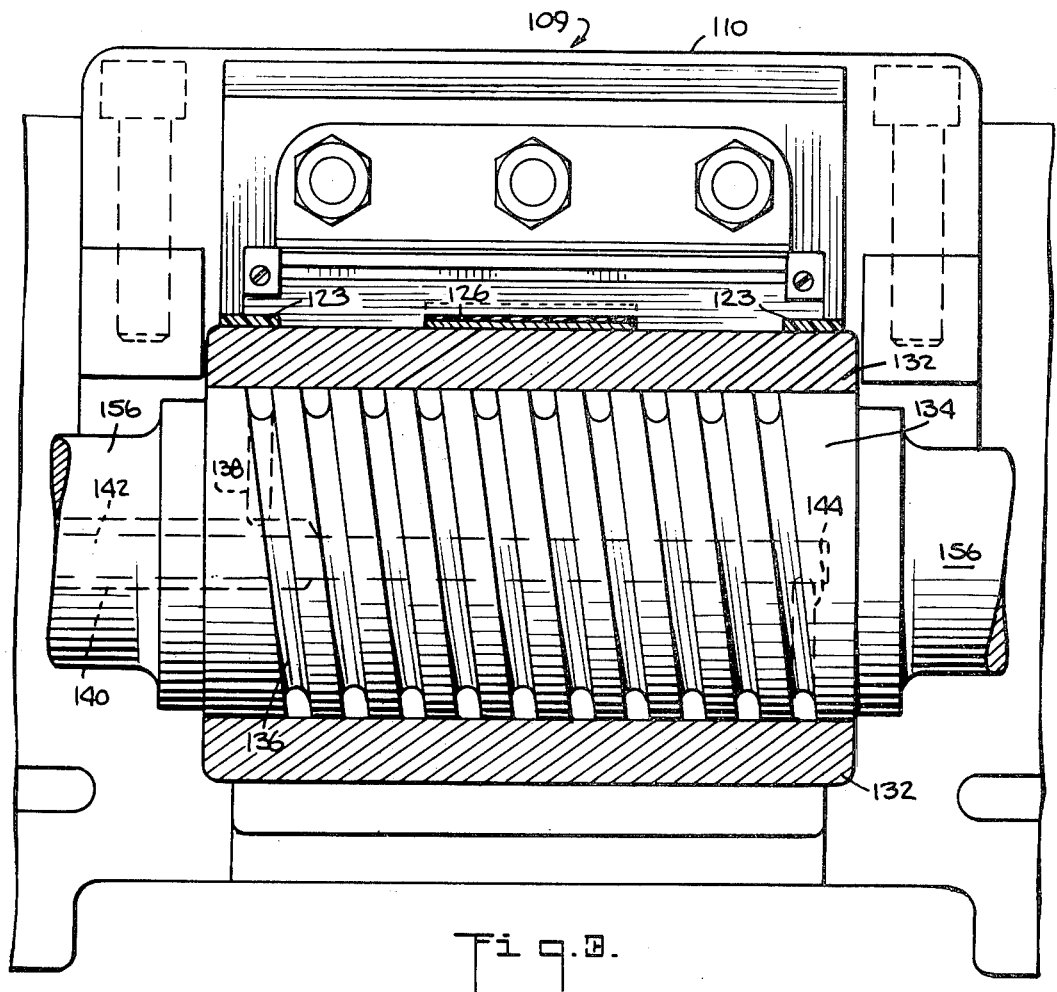

Referring now to the drawings and more particularly to FIGS. 1-16, which relate to the first embodiment of the present invention, FIG. 1 is a schematic plan view illustrating apparatus pursuant to the present invention. The apparatus employs an extruder assembly denoted generally by the reference character 100. The extruder assembly 100 includes an extrusion barrel 102 in which, in a conventional manner is rotatably disposed an extrusion screw 104 having a helical thread flight 106. The extrusion screw 104, upon rotating, acts to extrude and feed elastomeric stock 108 in the direction of arrow A toward a die-roller calendering unit, shown generally at 109, which includes an extrusion die-head 110. The elastomeric stock 108 may be a natural or synthetic rubber, a blend of natural and synthetic rubbers, a synthetic elastomeric resin, combinations of natural rubber and synthetic resins, or any other suitable composition generally utilized in the manufacture of fabric reinforced elastomeric articles, for example conveyor belts, tires and the like.

The extrusion screw 104 acts to feed the elastomeric stock 108 toward a transition pressure chamber 112 which widens laterally, or in a horizontal plane, as illustrated in FIG. 1, and narrows in a vertical plane, as illustrated in FIG. 2. The transition pressure chamber 112 is provided with an elongate trunk portion 114 which communicates with an arcuate segment of a roller 116, the arcuate segment of the roller 116 being generally defined as that segment between the imaginary radial lines X and Y denoted in FIG. 2. The roller 116 is provided with a generally uncontoured, substantially cylindrical surface, the roller 116 being appropriately supported, as will be clarified below, in proximity to the extrusion die-head 110.

The extrusion die-head 110, immediately downstream of the elongate trunk portion 114 of the transition pressure chamber 112, is provided with a stationary contoured, arcuate or curvilinear, secondary die segment guide-surface 118 which confronts, and is coextensive with, the roller 116 between the imaginary radial lines Y and Z denoted in FIG. 2. Immediately downstream of the secondary die segment guide-surface 118, there is provided a stationary, contoured, arcuate or curvilinear primary die segment guidesurface 120 which tapers or converges toward the roller 116 and confronts the latter, coextensively, between the imaginary radial lines X and Z denoted in FIG. 2. The primary die segment guide-surface 120 is formed as part of a vertically adjustable die-blade 122, the die-blade being vertically adjustable, by conventional means (now shown), so as to permit adjustments of the clearance between the roller 116 and the primary die segment guide-surface 120.

The die-blade 122 is provided with a pair of conventional stationary, low-friction bearing members 123, as illustrated in FIG. 3, which directly engage the roller 116 yet permit generally unrestrained rotation of the latter. The primary die segment guide-surface 120, in cooperation with the arcuate segment of the roller 116 between the imaginary radial lines X and Z, acts to define a nozzle-like horn or wedge-shaped pressure chamber 125 through which the elastomeric stock 108 passes under progressively increasing pressure to impregnate a fabric.

As indicated above, the illustrated generally in FIG. 3, the primary die segment guide-surface 120 of the die-blade 122 is contoured and defines cooperatively with the roller 116 a narrow restriction orifice 126, the primary die segment guide-surface 120 being laterally contoured, rectangularly in this instance, axially of the roller 116. The roller 116 constitutes an axially uncontoured remaining portion of the narrow restriction orifice 126, the uncontoured portion being formed as part of the outermost periphery of an outer annular segment 132 of the roller 116. The outer annular segment 132 is fixedly mounted upon, and rotatable with, an inner helically threaded segment 134 of the roller 116. The outer surface of the helically threaded segment 134 and the inner surface of the annular segment 132 cooperate to provide a helically extending coolant channel 136 through which a coolant, such as cooling water or the like, may flow. The coolant may be fed thereto via a radial passageway 138 and an annular coolant feed chamber 140 which surrounds an inner coolant return chamber 142, the return chamber 142 communicating directly with a second, terminal, radial passageway 144 of the coolant channel 136 to provide means through which the coolant may egress from the roller vicinity.

Referring once again to FIG. 1, the roller 116 is rotatably driven in the direction of arrow B (FIG. 2) or in the general direction of feed of the elastomeric stock 108 by a drive means shown generally at 145. The drive means 145 includes a variable speed motor 146 which cooperates with a reduction gearing assembly 148 through the intermediary of an endless belt 150 mounted upon both a driver pulley 152 and a driven pulley 154, the driver pulley being mounted upon the motor assembly 146 and the driven pulley upon the gearing assembly 148. The roller 116 is provided with an axle unit 156 appropriately journalled in support bearings 158, one end of the axle unit 156 being suitably driven by the reduction gearing assembly 148. The drive means 145 provides for suitable control of the peripheral speed or rotational rate of the roller 116.

As illustrated in FIG. 2, a fabric 160 of the type utilized for conveyor belts, transmission belts, or straps in general for various uses, having warps 162 and wefts 164 (FIG. 16) interlaced with one another, or for that matter any fabric having discrete interstices or the like, is guided by conventional means (not shown) from a conventional fabric supply assembly 165 to the roller 116 and through the wedge-shaped pressure chamber 125. The elastomeric stock 108, as it is extruded toward the roller 116, contacts and impregnates the fabric 160 overlying the roller 116 between the imaginary radial lines X and Y. The impregnated fabric then issues from the restriction orifice 126 as a coated and impregnated fabric product 166 and is guided by conventional means (not shown) upon a conventional product take-up assembly 167. The product take-up assembly 167 is preferably driven in such a manner that the fabric 160 moves at the same speed as the periphery of the roller 116 through pressure chamber 125. The fabric supply assembly 165, on the other hand, is preferably braked sufficiently to maintain suitable tension in the fabric 160 between assembly 165 and chamber 125.

Figure 5:
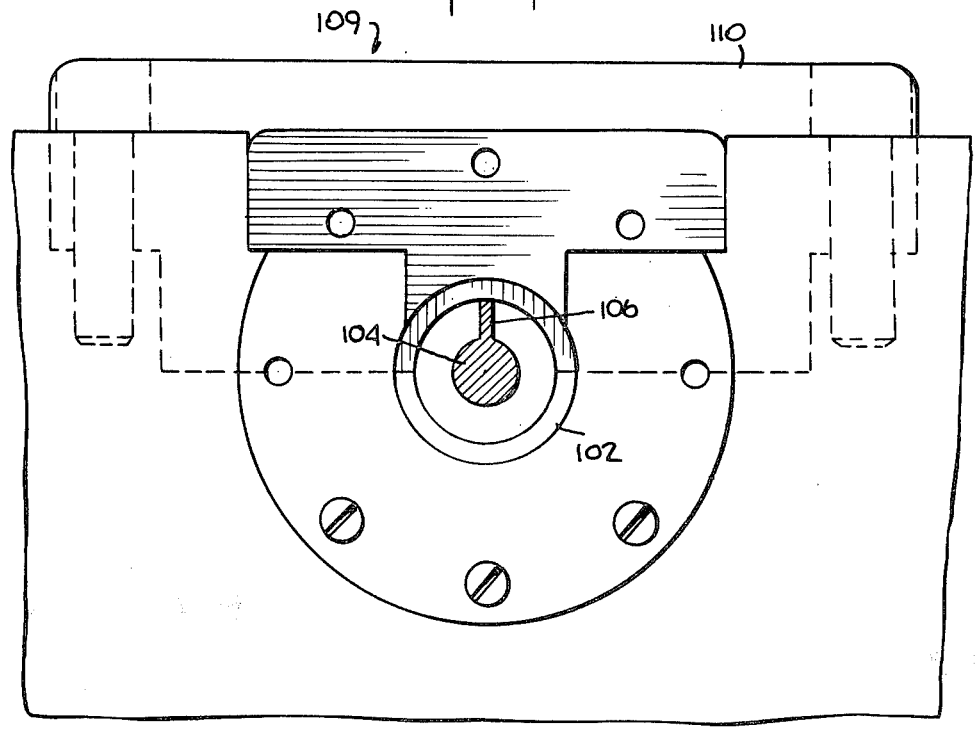
FIG. 5 is a fragmentary, partially cross-sectional view, on a reduced scale, taken along the line 5—5 in FIG. 2.
Figure 12:
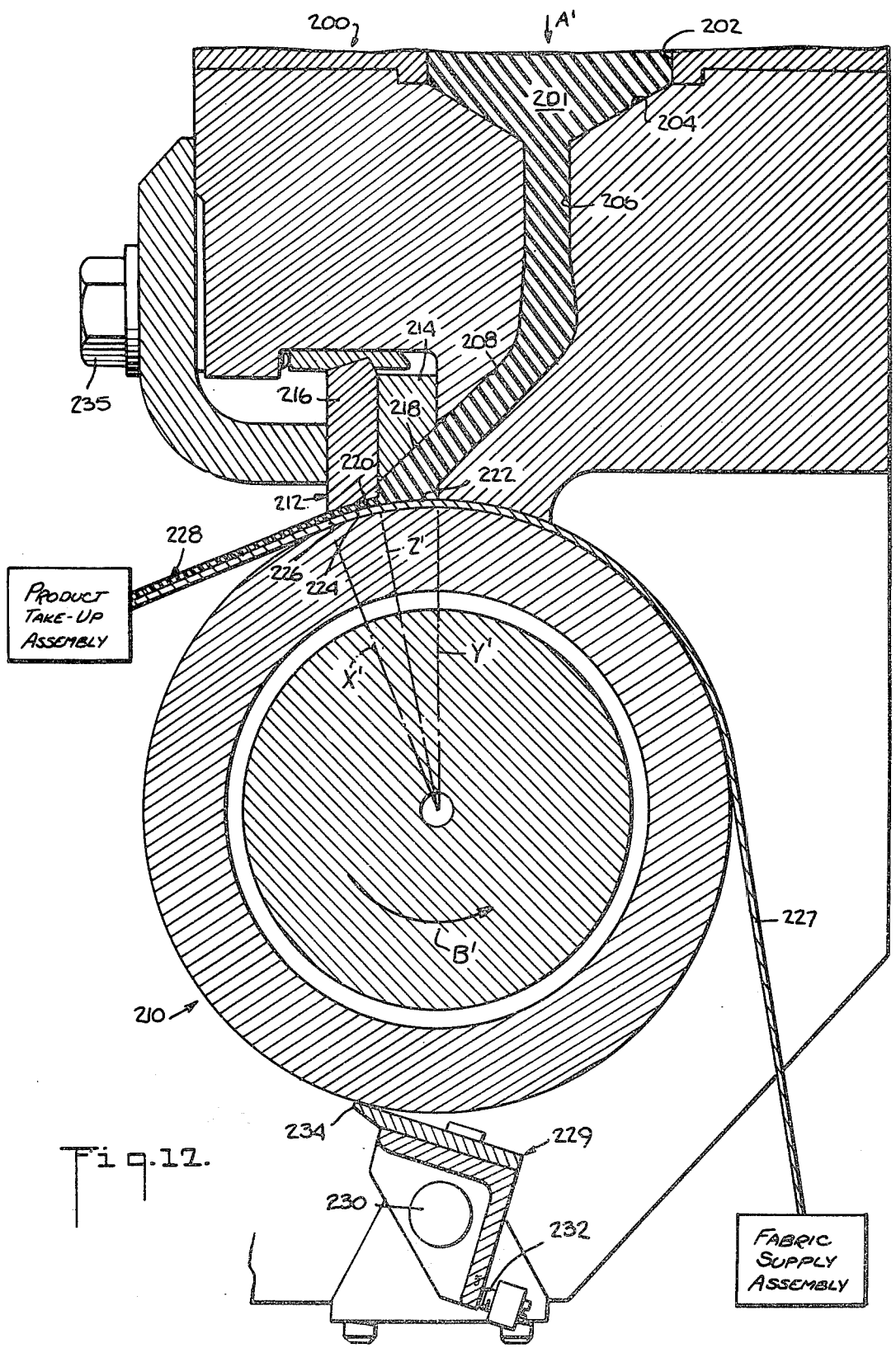

The exit end 168 of extrusion barrel 102 is circular in cross section, as shown in FIG. 5. Accordingly, in operation the helical thread flight 106 of the extrusion screw 104 causes the elastomeric stock 108 to be discharged from the extrusion barrel 102 in cylindrical form. The extrusion screw 104 and extrusion barrel 102 cooperatively generate a pressure which is imparted to the elastomeric stock 108 as the latter is processed through the barrel 102, out the exit end 108 of the barrel and into the confines of the transition pressure chamber 112. As discussed above, the transition pressure chamber 112 and elongate trunk portion 114 widen laterally, or in a horizontal plane, and are contoured in a manner successively illustrated in FIGS. 7–15. In this respect, that portion of the transition pressure chamber 112 which narrows in a vertical plane, as illustrated in FIG. 2, is provided with a successively changing contour illustrated in FIGS. 7–9, by which the elastomeric stock 108 is converted from a generally cylindrical or circular appearance to that of a generally twin-paddled appearance.

Thereafter, the elongage trunk portion 114 of transition pressure chamber 12 commences, as shown in FIG. 10. Trunk portion 114 changes and increases in lateral expansion from the configuration illustrated in FIG. 10 to the configuration illustrated in FIG. 15, this through the intermediary of a gradual change in contour illustrated in FIGS. 11–14. FIGS. 10–14 illustrate that the elastomeric stock is converted from the generally twin-paddled appearance illustrated in FIG. 9 to that of an increasingly elongated dumb-bell shaped configuration illustrated in FIG. 14. The elastomeric stock 108 is ultimately formed into a flat slab having a configuration illustrated in FIG. 15, and is thereafter fed onto the roller 116.

The relationship of FIGS. 7–15 is correlated generally with the respective imaginary lines 7—7 through 15-15 illustrated both in FIGS. 2 and 6, FIG. 2 illustrating the vertical change in contour of the transition pressure chamber 112 and FIG. 6 illustrating the horizontal change in contour of the chamber 112. Thus, the elastomeric stock is converted from the cylindrical or circular cross sectional configuration illustrated in FIG. 7, immediately downstream of the extrusion barrel 102, to the low, wide cross-sectional configuration illustrated in FIG. 15, at the end of the elongate trunk portion 114, and is thereafter fed toward the driven roller 116.

Figure 4:
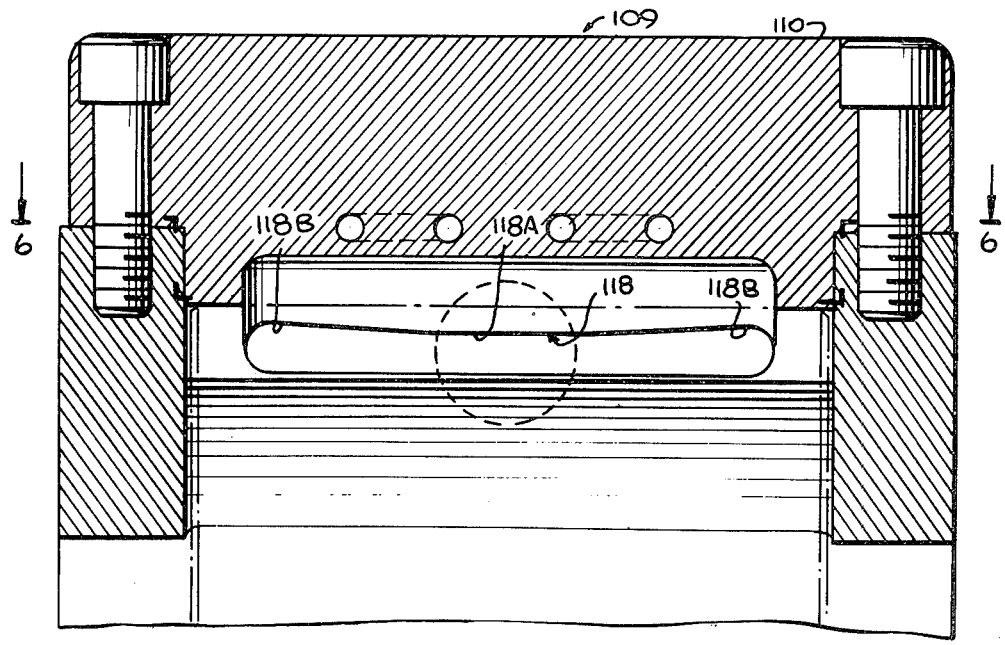
FIG. 4 is a fragmentary, cross-sectional view, on a reduced scale, taken along the line 4—4 in FIG. 2.

The secondary die segment guide-surface 118 (FIG. 2) is arcuate in nature, generally circumferentially of the roller 116, and is laterally contoured in a manner illustrated in FIG. 4. The secondary die segment guide-surface 118 is so contoured as to provide a low intermediate portion 118A and higher end portions 118B, respectively. The intermediate portion 118A is closer to the roller 116 than the end portions 118B and causes the elastomeric stock 108, having the configuration illustrated in FIG. 15, to be squeezed vertically at the intermediate portion 118A and laterally outwardly to the end portions 118B. This ensures that the elastomeric stock 108 is uniformly distributed into the confines of the wedging pressure chamber 125 defined by the primary die-segment guide-surface 120 and the peripheral surface of the roller 116.

The roller 116, as it is rotatably driven by the drive means 145, and the fabric 160 moving with the roller through pressure chamber 125, act to impart energy into the elastomeric stock 108. They thereby increase the pressure initially imparted to the elastomeric stock by the extrusion screw 106 and extrusion barrel 102 in an additive or supplemental manner. The roller 116 and primary die segment guide-surface 120 function in a manner similar to that of a calendering apparatus and add significantly to the overall pressure to which the elastomeric stock 108 is subjected as the latter passes through the wedge-shaped pressure chamber 125. The overall or combined pressure developed by the extruder assembly 100 and the die-roller calendering unit 109 ensures that the elastomeric stock 108 will properly, and under significant pressure, flow uniformly into contact with and thoroughly impregnate the fabric 160.

In this respect, a significant feature of the present invention is the arcuate nature of the primary die segment guide-surface 120 which, circumferentially of the roller 116, as viewed in FIG. 2, presents a concavity confronting and converging toward the roller 116. The concavity of the surface 120 in conjunction with the convexity of the segment of the roller 116, between the imaginary radial lines X and Z, define the elongate, low-angle, wedge-shaped pressure chamber 125 through which both the elastomeric stock 108 and fabric 160 concomitantly pass under pressure. The elastomeric stock 108 moves into progressively increasing pressurized contact with the fabric 160 as it proceeds through the pressure chamber 125 from the imaginary radial line Z to the imaginary radial line X. Because of the concave (as viewed in FIG. 2) nature of the surface 120, this surface is in substantially greater proximity to the roller 116 than would be the case with the convex surface of an opposing roller mate for the roller 116 (had roller 116 been provided as a part of a conventional two-roll calendering assembly in which the mate is of similar outer diameter).

The chamber 125 may, therefore, be characterized as an elongate nip through which both the elastomeric stock 108 and fabric 160 concomitantly pass, the effective working surface extent of the nip being substantially greater than that of the nip between opposing similar outer-diameter rollers of a conventional calendering assembly, the elongate nip pursuant to the present invention narrowing, cross-sectionally, as the surface 120 converges toward the roller 116.

Pursuant to a principal concept of the present invention, it is contemplated that the surface 120 may also be non-curvilinear, or of straight line character, having a substantially infinite radius of curvature, so that the surface 120 at the rear face 169 of the die-blade 122 is still in substantially greater proximity to the roller 116 than the remaining portions thereof, and so that there still remains an elongate, wedge-shaped pressure chamber or nip having an effective working surface extent greater than that of a conventional opposing-roller calendering assembly.

In either instance, during the coating operation the elastomeric stock 108 is increasingly pressured against and impregnated into the fabric 160 for a longer period of time and over a longer effective working nip extent than conventional opposing-roller calendering assemblies can provide. This optimizes the degree of impregnation of the fabric 160 by the elastomeric stock 108. Moreover the thickness elastomeric coating of the product 166 is controllable because of the vertically adjustable nature of the die-blade 122.

Accordingly, the coating method of the present invention, utilizing principally the first embodiment illustrated generally by the FIGS. 1–15, wherein improved impregnation of the fabric with elastomeric stock is achieved, involves feeding both a fabric and elastomeric stock under pressure concomitantly between mutually confronting, generally converging, coextensive, stationary and movable surfaces which cooperatively define an elongate pressure chamber. The stationary surface in this instance refers, preferably, to that of the primary and secondary die segment guide-surfaces 120 and 118 respectively. The movable surface refers, preferably, to the rotatable roller 116, and the elongate pressure chamber refers, preferably, to the wedge-shaped pressure chamber 125. Thereafter, the cross-sectional thickness of the elastomeric stock is significantly reduced, thinned or otherwise narrowed under increasing pressure as it increasingly impregnates not only the interstices of the fabric 160, but also the warp and weft fibers of the fabric themselves. The coated fabric then issues through a narrow restriction orifice, namely the restriction orifice 126 at the end of the wedge-shaped pressure chamber 125.

The coating method further involves the driving of the roller 116 to supplement or add to the initial pressure to which the elastomeric stock 108 is subjected by the extrusion screw 104 and the extrusion barrel 102, the roller 116 being driven at a rate sufficient to frictionally carry and thereby wedge, through the intermediary of the fabric 160, an increased quantity of the elastomeric stock 108 into and through the wedging chamber 125 to increase the extent of impregnation of the fabric 160 by the elastomeric stock 108.

Figure 19:
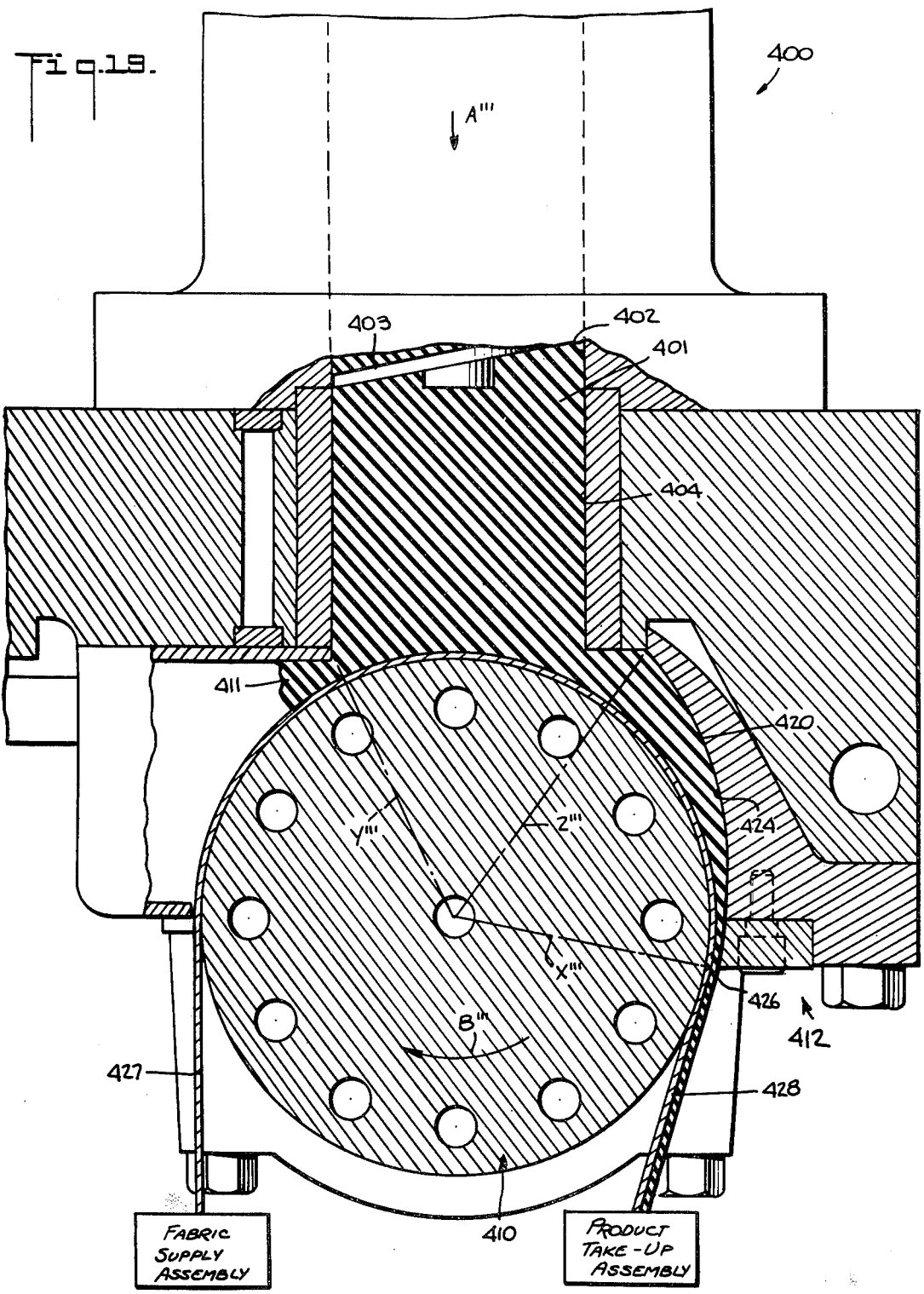
FIG. 19 is a view similar to that of FIG. 2 but illustrating a fourth embodiment of the present invention.

FIGS. 17–19 illustrate second, third and fourth embodiments, respectively, of the apparatus pursuant to the present invention by which the method of the present invention, as discussed above, may be also achieved. The nature of the apparatus of the second, third and fourth embodiments is described below.

In this respect, referring now to FIG. 17, the second embodiment is denoted generally by reference character 200 and utilizes an extrusion head into which elastomeric stock 201 is extruded by means of an extrusion barrel 202 and an extrusion screw (now shown), the elastomeric stock 201 being extruded or fed in the direction of arrow A' into a transition pressure chamber 204. The transition pressure chamber 204 narrows in the plane of FIG. 17, yet widens in a plane transverse of the plane of FIG. 17, in a manner generally described above for the transition pressure chamber 112 in the first embodiment of FIGS. 1–15. The transition pressure chamber 204 is provided with a pair of elongate trunk segments 206 and 208 respectively which are inclined with one another and communicate with a driven roller 210, the roller 210 being driven in the direction of arrow B', the segment of the roller 210 with which the elongate trunk segment 208 communicates being defined by the imaginary radial linex X' and Y'.

Directly above the roller 210, there is provided a shaping die-blade assembly 212 having both a pre-shaping die-blade 214 and a final shaping die-blade 216, each confronting the roller 210. The pre-shaping die-blade 214 is provided with a stationary secondary die segment guide-surface 218 which is generally flat, circumferentially of the roller 210, and contoured axially of the roller 210. The secondary die segment guide-surface 218 confronts coextensively, the roller 210 between the imaginary radial lines Y' and Z'. On the other hand, the final shaping die-blade 216 is provided with a primary die segment guide-surface 220 of stationary nature which is arcuate circumferentially of the roller 210 and presents a concavity which directly and coextensively confronts the roller 210 between the imaginary radial lines X' and Z'. Both the final shaping die-blade 216 and the pre-shaping die-blade 214 are spaced proximate the roller 210, the secondary die segment guide-surface 218 defining with the roller 210 a secondary wedge-shaped pressure chamber 222, whereas the primary die segment guide-surface 220 cooperatively defines with the roller 210 a primary wedge-shaped pressure chamber 224.

The primary wedge-shaped pressure chamber 224 terminates in a narrow restriction orifice 226 having a configuration similar to that of the restriction orifice denoted in FIG. 3 for the aforementioned first embodiment. The elastomeric stock 201 is discharged through orifice 226 after coating and impregnating a fabric 227, which fabric is guided over the roller 210 by conventional means (not shown) from a braked, conventional fabric supply assembly. The fabric 227 issues from the restriction orifice 226 as an elastomeric stock coated and impregnated fabric product 228 and is guided by conventional means (not shown) upon a suitably driven, conventional take-up assembly.

Accordingly, in operation, the elastomeric stock 201 is processed through the extrusion barrel 202, into the transition pressure chamber 204 and through both of the elongate trunk segments 206 and 208. While the elastomeric stock 201 passes under pressure from the extrusion barrel 202 through the transition pressure chamber 204 and the elongate trunk segments 206 and 208, the elastomeric stock 201 undergoes a change in cross-sectional configuration in a manner similar to the change in cross-sectional configuration that the elastomeric stock 108 undergoes in the first embodiment of the invention, as illustrated in FIGS. 7–15.

Thereafter, the elastomeric stock 201 is fed onto the fabric 227 overlying roller 210 in secondary pressure chamber 222, wherein it undergoes a pre-shaping and initial fabric impregnation stage. The elastomeric stock and fabric 227 ultimately pass into the primary wedge-shaped pressure chamber 224, wherein the fabric 227 is increasingly impregnated as the pressure of the elastomeric stock progressively increases in chamber 224. The coated and impregnated fabric then exits from the restriction orifice 226 in the form of the product 228. The roller 210, is driven in a manner similar to that of the roller 116 in the embodiment of FIGS. 1–15. Roller 210 acts to impart energy into the elastomeric stock 201 to thereby increase the overall pressure to which the elastomeric stock 201 is subjected. The resultant pressure of the elastomeric stock reflects the addition to the pressure developed in the extension barrel 202 of the pressure developed by the driven roller 210.

In order to permit cleaning of the roller 210, there is provided a roller cleaning-blade 229 which is journalled upon a pivot pin 230 and provided with a threadedly adjustable screw 232 for tilting the knife edge 234 into engagement with the substantially cylindrical surface of the roller 210. The knife edge 234 acts to wipe, scrape or otherwise remove any of the elastomeric stock 201 which tends to build-up or cake upon the peripheral surface of the roller 210.

The shaping die-blade assembly 212 is vertically adjustable to provide means for controlling the thickness of the elastomeric coating in the product 228. Vertical adjustment of guide-surfaces 220 and 218 is permitted as the shaping die blade assembly 212 is provided with a vertically elongate slot (not shown) or the like surrounding a die-holding bolt assembly 235.

The third embodiment of the apparatus pursuant to the present invention is illustrated in FIG. 18 and denoted generally by the reference character 300. In this instance the elastomeric stock 301 is extruded or fed in the direction of arrow A″ through a "cross-head" type of barrel 302 (as opposed to the "in-line" type of the previous embodiments) and into a transition chamber 304 having an elongate trunk segment 306. During this stage the elastomeric mass 301 undergoes narrowing generally transversely of the plane of FIG. 18 to be converted from a generally cylindrical cross-sectional configuration to that of a flat cross-sectional configuration in a manner similar to that of the change in cross-sectional appearance that the elastomeric stock 108 undergoes in the first embodiment, as illustrated in FIGS. 7–15.

The elastomeric stock 301 is then fed onto a roller 310 which is driven in the direction of arrow B″ where it is subjected to the effects of a shaping die-blade assembly 312, the shaping die-blade assembly 312 having a shaping die-blade 316 formed with both a secondary die segment guide-surface 318 and a primary die segment guide-surface 320. Each of the guide-surfaces 318 and 320, respectively, is provided with a concavity circumferentially of the roller 310, which concavities confront the latter. The concavity of the secondary die segment guide-surface 318 is of deepened nature and confronts the roller 310 between the imaginary radial lines Y″ and Z″, whereas the concavity of the primary guide segment guide-surface 320 is shallow and confronts the roller 310 between the imaginary radial lines X″ and Z″.

Both of the guide-surfaces 318 and 320 cooperate with the roller 310 for defining respectively, a secondary wedge-shaped pressure chamber 322 and a primary wedge-shaped pressure chamber 324, the latter of which terminates in a restriction orifice 326. The elastomeric stock 301 is passed successively through chambers 322 and 324 to increasingly impregnate a fabric 325 guided over the roller 310 by conventional means (not shown) from a braked conventional fabric supply assembly. The fabric 325 issues from the restriction orifice 326 as an elastomeric stock coated and impregnated fabric product 327 and is guided by conventional means (not shown) upon a suitably driven, conventional take-up assembly.

In this instance, likewise, the shaping die-blade assembly 312 and roller 310 represent an assembly in the nature of a calendering unit which is downstream of the extruder barrel 302. This assembly, in an additive or supplemental manner, increases the overall pressure to which both the fabric 325 and the elastomeric stock 301 are subjected in order to ensure that the interstices of the fabric in product 327 will be highly uniformly impregnated, by the elastomeric stock.

Referring now to FIG. 19, a fourth embodiment of the apparatus pursuant to the present invention is illustrated. The embodiment in this instance is denoted generally by the reference character 400 and is utilized for extruding elastomeric stock 401 in the direction of arrow A‴ from an extrusion barrel 402, such as by means of an extrusion screw 403, into and through a transition pressure chamber 404 and onto a roller 410 driven in the direction of arrow B‴. The elastomeric stock 401 has a portion 411 which contacts the roller 410 in an unrestricted manner, the rotation of the roller 410 in the direction of arrow B‴ preventing the portion 411 of the stock 401 from enlarging beyond control and loosening from the periphery of the roller 410. The transition pressure chamber 404 in this instance is generally cylindrical, concentric with the interior of the extrusion barrel 402 and communicates directly with the roller 410 between the imaginary radial lines Y‴ and Z‴.

In this instance, there is provided a shaping die-blade 412 having an extensive arcuate stationary die segment guide-surface 420 which coextensively confronts the roller 410 between the imaginary radial lines Z''' and X'''. As in the instances of the first, second, and third embodiments discussed above, the die segment guide-surface 420 converges, with increasing proximity, toward the roller to define with the latter a wedge-shaped pressure chamber 424 terminating in a restriction orifice 426, through which chamber 424 the elastomeric stock 401 passes to increasingly impregnate a fabric 427 guided over the roller 410 by conventional means (not shown) from a braked, conventional fabric supply assembly. The fabric 427 issues from the restriction orifice 426 as an elastomeric stock coated and impregnated fabric 428 and is guided by conventional means (not shown) upon a suitably driven, conventional take-up assembly.

In this embodiment, likewise, the wedge-shaped pressure chamber 424 is defined by both the stationary die segment guide-surface 420 and the roller 410, and, in an additive or supplemental manner, it increases the overall pressure to which both the fabric 427 and the elastomeric stock 401 are subjected, the resultant pressure being that pressure initially imparted to the stock 401 simply by the extrusion apparatus alone, and also the pressure as developed by the roller 410 as the latter is rotatably driven in the direction along which the elastomeric stock 401 is fed thereupon. Thus, the overall energy imparted to the elastomeric stock 401 is increased and this ensures that, as the product 428 is discharged through the restriction orifice 426 the interstices of the fabric therein will be highly and uniformly impregnated with elastomeric stock.

Accordingly, although each of the embodiments differ slightly from one another with regard to the elongate extent, and degree of convergence, of the respective pressure chambers defined by the mutually confronting movable and stationary surfaces, each and every one of the structural embodiments of the present invention permits means for practicing the method discussed above in which both the elastomeric stock and fabric are fed concomitantly between the mutually confronting coextensive stationary and movable surfaces having increased effective working nip extents which cooperatively define the elongate, convergent, horn-like, pressure chamber.

While in the pressure chamber, the elastomeric stock is narrowed in cross-sectional and, under progressively increasing pressure, increasingly impregnates the fabric as both are concomitantly passed along the elongate nip and issue from a narrow restriction orifice at the end of the nip or pressure chamber. The pressure chamber as defined by the confronting stationary and movable surfaces, adds to the extent of overall pressure, pressure-inducing effective structure, and residence period during which the fabric and elastomeric stock are biased against one another, to ensure the formation of product, in the nature of conveyor belt or the like, in which the fabric interstices are most highly and uniformly impregnated by elastomeric stock.

Figure 16:
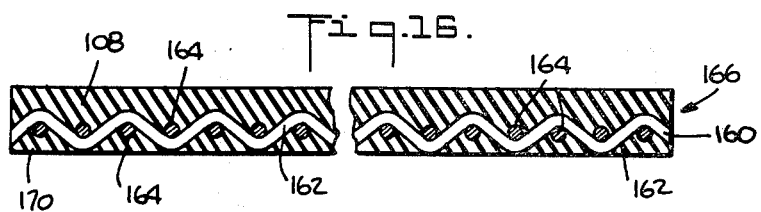
FIG. 16 is a fragmentary cross-sectional view of the elastomeric stock coated and impregnated fabric product formed by the first embodiment of the present invention.

As illustrated in FIG. 16, the upper portion of product 166 comprises an elastomeric coating of predetermined thickness and the lower portion of product 166 is uncoated, the elastomeric stock on the lower portion of the product comprising only that stock which passed through the interstices of the fabric 160 during the manufacture of product 166. Should it be desired to place a coating of predetermined thickness on the lower portion of product 166, the product 166 may be recycled through the apparatus of the present invention with the surface 170 of the product 166, which was initially in contact with the roller 116, now placed remote from the surface of the roller 116 so as to directly confront the stock 108 (FIG. 2) as the latter is extruded thereupon. In recycling the product 166 with its increased quantity and thickness of elastomeric stock 108, the die-blade 122 should be vertically adjusted (elevated) to compensate for the new thickness of the product.

The elastomeric stock 108, as added during the recycling operation, acts to fill any unfilled voids or fabric interstices along or adjacent the surface 170 of the product 166, and binds with the already introduced stock 108 to provide not only a product of extremely high quality, but one in which the dimensions thereof can be easily and reliably varied. The invention contemplates either a manual or an appropriate roller-feed system for reversing of the product as it is returned to the roller 116.

Figure 20:
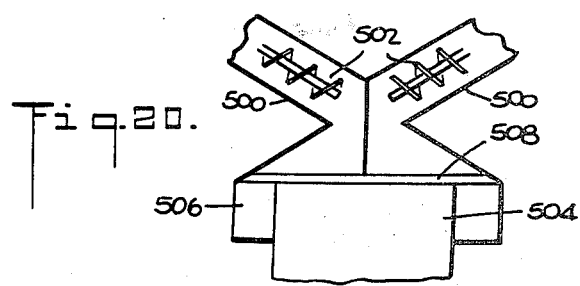
FIG. 20 is a schematic view of a plurality of extrusion units in common communication with extrusion die-blade and roller apparatus pursuant to any of the above four embodiments.

Referring now to FIG. 20, the present invention permits the impregnation of extremely wide fabrics by elastomeric stock fed thereupon by a plurality of extrusion devices commonly in communication with a single roller. In this respect, a plurality (two in this instance) of extrusion barrels 500, each having a respective extrusion screw 502 rotatably disposed therein, act to commonly extrude elastomeric stock in a direction converging toward one another and upon a fabric 504 fed over a driven roller 506 underlying an extrusion die-blade assembly 508. The relationship of the driven roller 506 and extrusion die-blade assembly 508 with one another, is that which is akin, in principal and structure, to the first four embodiments fully discussed above and is, thus, omitted from discussion herein.

The principal of the illustrative subject matter in FIG. 20 relates to extruding a quantity of elastomeric stock which is beyond the feasibility of a single extruder, but a quantity nonetheless which is required to be sufficiently widely distributed over an extremely wide fabric to impregnate the latter adequately. Thus, eachh of the extruder units cooperate with one another and feeds a discrete quantity of stock upon the fabric, the stock from each unit blending with one another and commonly impregnating the fabric.

Numerous alterations of the structure herein disclosed will suggest themselves to those skilled in the art. However, it is to be understood that the present disclosure relates to preferred embodiments of the present invention which are for purposes of illustration only and not to be construed as limitations of the invention.

What is claimed is:

1. Apparatus for coating a warp and weft cord fabric with elastomeric stock wherein improved impregnation of the interstices between the warp and weft cords of the fabric is achieved, said apparatus comprising a roller, a primary and a secondary die segment each having a respective elastomeric stock wedging surface confronting said roller in spaced relation, said wedging surface of said primary die segment and a confronting arcuate segment of said roller cooperatively defining a convergent pressure chamber terminating in a restriction orifice which normally of said fabric is of wider extent than the thickness of said fabric, means for introducing a fabric into said chamber and onto said arcuate segment of said roller to be carried by the latter to and through said restriction orifice, means for introducing elastomeric stock under pressure generally in the direction of advancement of and upon said fabric upstream of said chamber to at least partially impregnate interstices of said fabric upstream of said chamber, said secondary die segment abutting said primary die segment upstream of the latter and being spaced more remotely from said roller than said primary die segment, said wedging surface of said secondary die segment defining with said roller the region under pressure in which said stock at least partially impregnates said fabric upstream of said chamber, and drive means for rotating said roller to frictionally carry and wedge both said fabric and the stock already having at least partially impregnated the interstices of said fabric into and through said chamber whereupon said stock increasingly impregnates the interstices in as well as the warp and weft cords of said fabric under increasing pressure in excess of the pressure at which said stock is initially urged by said wedging surface of said secondary die segment against said fabric upstream of said chamber and undergoes a reduction in cross-sectional thickness, said chamber having an elongate extent sufficient to enable said stock to resist substantial swelling after the latter issues with said fabric from said restriction orifice.

2. Apparatus as claimed in claim 1 wherein said restriction orifice is defined in part by said roller and in remainder by said primary die segment wedging surface.

3. Apparatus as claimed in claim 1 wherein said roller includes a substantially cylindrical surface, said primary die segment wedging surface, at least at the end of said chamber, being contoured so as to define a portion of said restriction orifice and impart to said elastomeric stock a final configuration of selected contour.

4. Apparatus as claimed in claim 1 wherein said primary die segment wedging surface is inclined in a downstream feed direction toward said roller and terminates in a free end portion at and beneath which said restriction orifice is disposed.

5. Apparatus as claimed in claim 1 wherein said primary die segment wedging surface is at least partially arcuate to define a concavity which confronts and converges toward said arcuate segment of said roller.

6. Apparatus as claimed in claim 1 including drive means for controlling the rotational rate of said roller relative to said primary die segment wedging surface.

7. Apparatus as claimed in claim 1 wherein said wedging surface of said secondary die segment converges toward, and is curvilinear circumferentially of, said roller.

8. Apparatus as claimed in claim 1 wherein said wedging surface of said secondary die segment converges toward, and is non-curvilinear circumferentially of, said roller.

9. Apparatus as claimed in claim 1 wherein at least said wedging surface of said primary die segment is adjustably spaced from said roller thereby to permit selective increasing or decreasing of the clearance therebetween.

10. Apparatus as claimed in claim 1 including means for re-feeding said fabric upon said roller such that a surface of said fabric, opposite that surface which said elastomeric stock initially impregnated, is confronted directly by said stock.

11. Apparatus as claimed in claim 1 wherein said means for introducing said elastomeric stock into said chamber includes means for extruding said stock.

12. Apparatus as claimed in claim 6 wherein said means for extruding said elastomeric stock includes an extrusion barrel, an extrusion screw rotatably supported in said barrel, and means for defining a transition pressure chamber between said extrusion screw and said chamber which is defined by said primary die segment wedging surface and roller, said transition pressure chamber being taperingly contoured to alter the cross-sectional configuration of said elastomeric stock from a generally circular contour to a generally rectangular contour of laterally elongate extent.

13. Apparatus as claimed in claim 11 wherein said means for extruding said elastomeric stock includes a plurality of extrusion barrels with associated extrusion screws in common extrusion communication with said roller.

* * * * *

UNITED STATES PATENT AND TRADEMARK OFFICE
CERTIFICATE OF CORRECTION

PATENT NO. : 3956056
DATED : May 11, 1976
INVENTOR(S) : John Janusz Boguslawski, Paul Geyer and Frederick Nishwitz Taff It is certified that error appears in the above-identified patent and that said Letters Patent are hereby corrected as shown below:

On the title page, in related U. S. Application data, item 62, "Patent No. 3896301" should read - - patent no. 3869304 - -.

In column 12, line 65 in claim 1 "A" should read - - said - -.

In column 14, line 27 in claim 12, "6" should read - - 11 - -.

Signed and Sealed this

Eleventh Day of April 1978

[SEAL]

Attest:

RUTH C. MASON
Attesting Officer

LUTRELLE F. PARKER
Acting Commissioner of Patents and Trademarks